(12) United States Patent
Ganireddy et al.

(10) Patent No.: US 11,223,208 B2
(45) Date of Patent: Jan. 11, 2022

(54) METHOD AND SYSTEM FOR CONTROLLING INTEGRATION OF DC POWER SOURCE IN HYBRID POWER GENERATION SYSTEM

(71) Applicant: General Electric Company, Schenectady, NY (US)

(72) Inventors: Govardhan Ganireddy, Salem, VA (US); Arvind Kumar Tiwari, Niskayuna, NY (US); Yashomani Y. Kolhatkar, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/640,414

(22) PCT Filed: Aug. 21, 2017

(86) PCT No.: PCT/US2017/047713
§ 371 (c)(1),
(2) Date: Feb. 20, 2020

(87) PCT Pub. No.: WO2019/040037
PCT Pub. Date: Feb. 28, 2019

(65) Prior Publication Data
US 2020/0366098 A1    Nov. 19, 2020

(51) Int. Cl.
*H02J 3/38* (2006.01)
*H02J 4/00* (2006.01)
(Continued)

(52) U.S. Cl.
CPC ............. *H02J 3/381* (2013.01); *H02J 4/00* (2013.01); *H02M 3/158* (2013.01); *H02M 5/458* (2013.01);
(Continued)

(58) Field of Classification Search
CPC .......... H02J 3/381; H02J 4/00; H02J 2300/28; H02J 2300/24; H02M 3/158; H02M 5/458; H02M 3/156
See application file for complete search history.

(56) References Cited

U.S. PATENT DOCUMENTS 5,161,097 A    11/1992    Ikeda
7,728,452 B2 *  6/2010    Arinaga ................. F03D 7/042
                                                   290/44
(Continued)

OTHER PUBLICATIONS

PCT International Search Report Corresponding to PCT/US2017/047713 dated May 3, 2018.
(Continued)

*Primary Examiner* — John W Poos
(74) *Attorney, Agent, or Firm* — Dority & Manning, P.A.

(57) ABSTRACT

A hybrid power generation system is presented. The hybrid power generation system includes a generator operable via a prime mover and configured to generate an alternating current (AC) power. The hybrid power generation system further includes a first power converter electrically coupled to the generator, where the first power converter includes a direct current (DC) link. Furthermore, the hybrid power generation system includes a DC power source configured to be coupled to the DC-link. Moreover, the hybrid power generation system also includes a second power converter. Additionally, the hybrid power generation system includes an integration control sub-system operatively coupled to the first power converter and the DC power source. The integration control sub-system includes at least one bypass switch disposed between the DC power source and the DC-link and configured to connect the DC power source to the DC-link via the second power converter or bypass the second power converter.

19 Claims, 9 Drawing Sheets

(51) Int. Cl.
*H02M 3/158* (2006.01)
*H02M 5/458* (2006.01)

(52) U.S. Cl.
CPC ....... *H02J 2300/24* (2020.01); *H02J 2300/28* (2020.01)

(56) References Cited

U.S. PATENT DOCUMENTS

2011/0285375 A1 11/2011 Deboy
2013/0322140 A1 12/2013 Park
2016/0352105 A1 12/2016 Tiwari et al.

OTHER PUBLICATIONS

Yehia, Fault Ride-Through Capability Enhancement of DFIG-Based Wind Turbine with Supercapacitor Energy Storage, XP032748802, 2014 IEEE International Conference on Power and Energy (PECon), Dec. 1, 2014, pp. 187-190.

\* cited by examiner

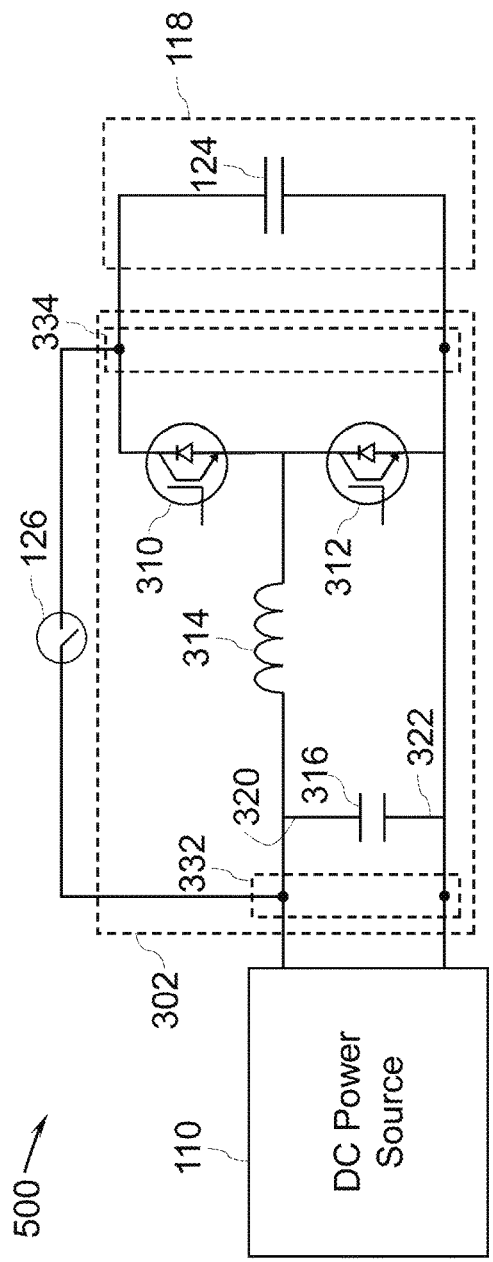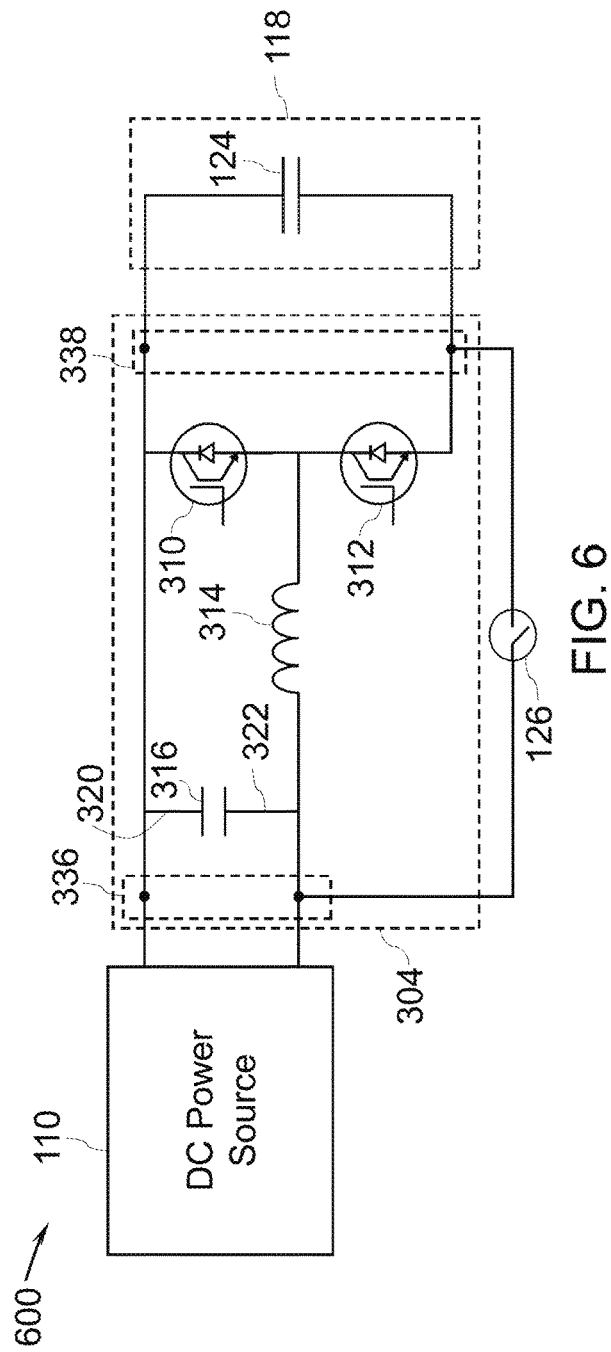

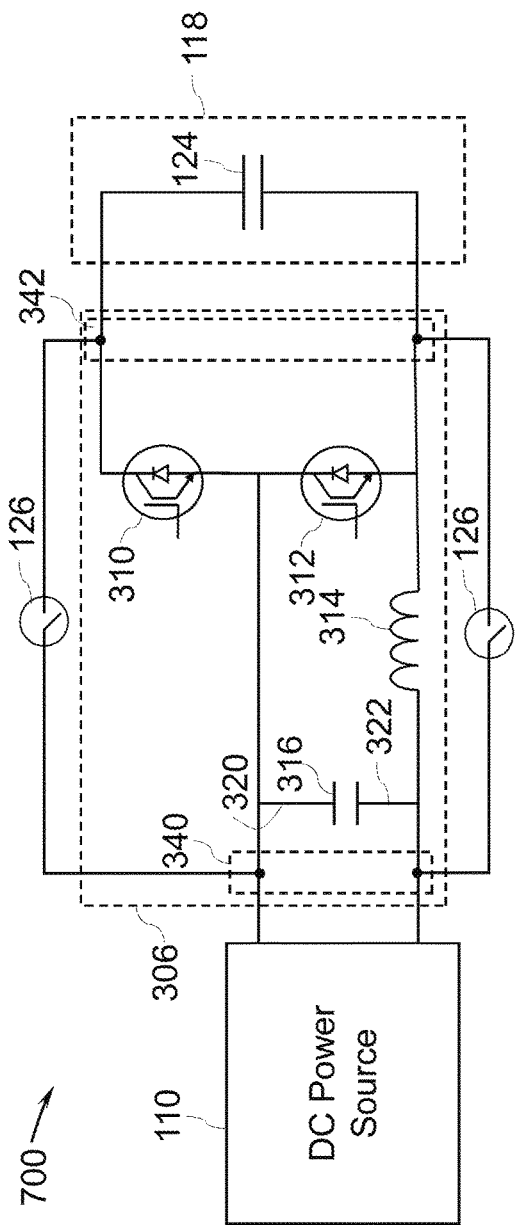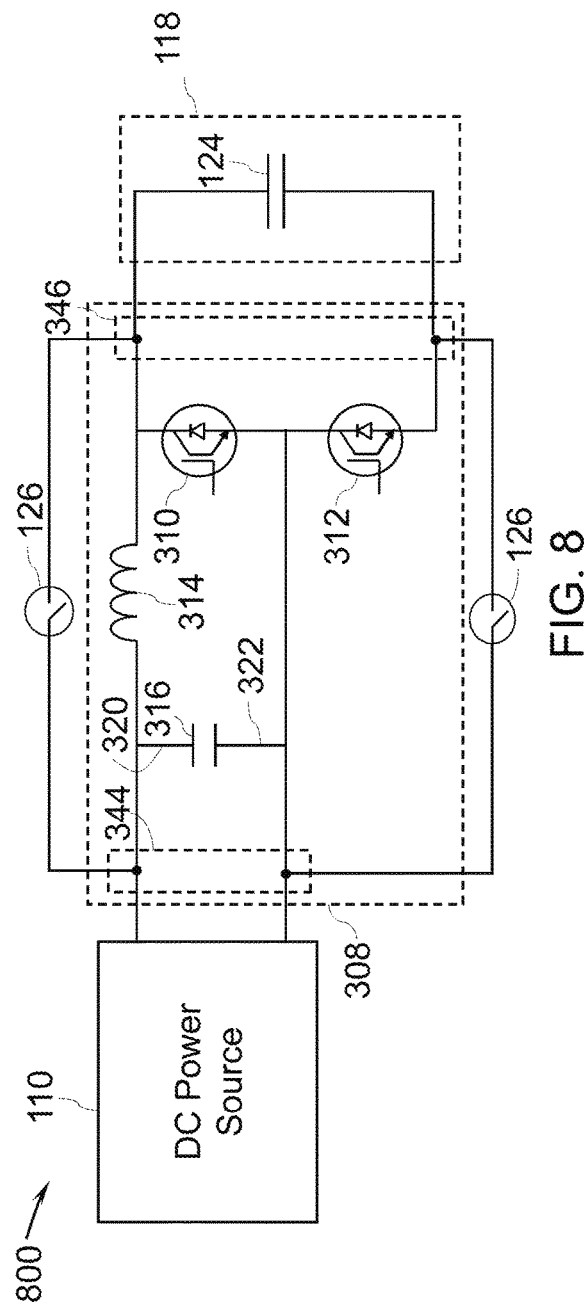

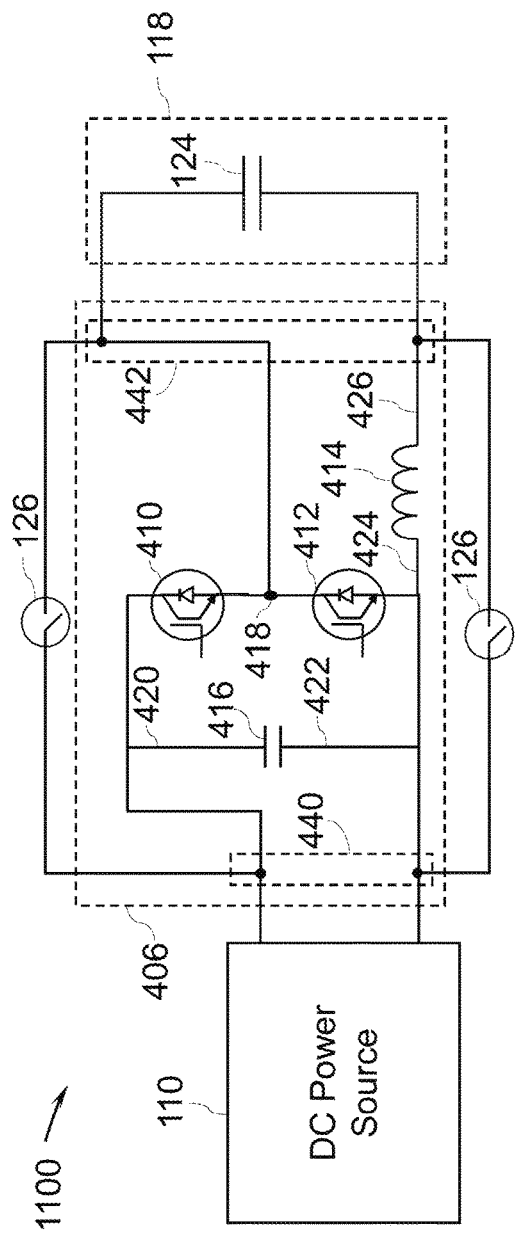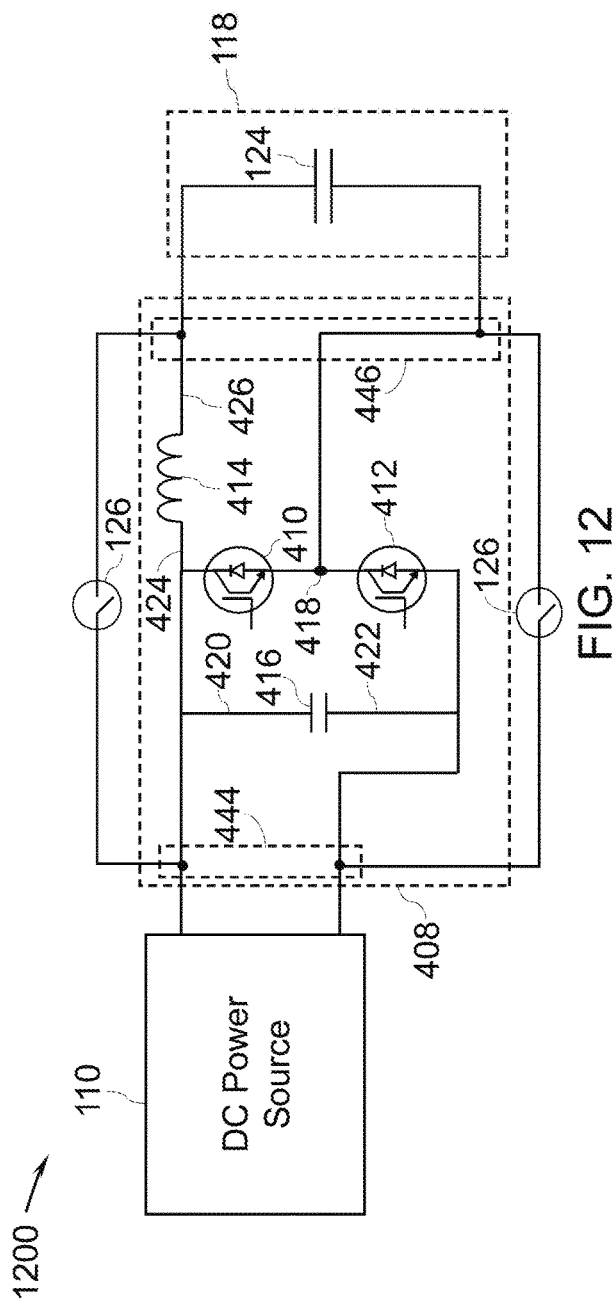

METHOD AND SYSTEM FOR
CONTROLLING INTEGRATION OF DC
POWER SOURCE IN HYBRID POWER
GENERATION SYSTEM

BACKGROUND

Embodiments of the present specification generally relate to a power generation system and in particular, to method and system for controlling integration of a DC power source in a hybrid power generation system.

Some currently available hybrid power generation systems employ a prime mover, an auxiliary power source (e.g., photovoltaic power source), and a synchronous generator with a full power conversion system or an asynchronous generator with the full power conversion system or a partial power conversion system. During operation of the power generation system, electrical power may be generated by one or both the asynchronous generator and the auxiliary power source. The electrical power thus generated may be supplied to electrical loads and/or an electric grid coupled to the power generation system.

In a conventional hybrid power generation system, the auxiliary power source is coupled to the asynchronous generator or the synchronous generator via one or more power converter(s). In such conventional hybrid power generation system, a power converter that is coupled to the auxiliary power source is selected such that a rated power of such power converter is sufficient to support/withstand maximum power generated by the auxiliary power source. Therefore, for the auxiliary power source having higher power generation capability, the corresponding power converter of increased rated power is required to be employed. Typically, such power converter of higher rated power is bulkier and costlier in comparison to a power converter of lower rated power.

BRIEF DESCRIPTION

In accordance with one embodiment of the present specification, a hybrid power generation system is presented. The hybrid power generation system includes a generator operable via a prime mover and configured to generate an alternating current (AC) power. The hybrid power generation system further includes a first power converter electrically coupled to the generator, where the first power converter includes a direct current (DC) link. Furthermore, the hybrid power generation system includes a DC power source configured to be coupled to the DC-link. Moreover, the hybrid power generation system also includes a second power converter. Additionally, the hybrid power generation system includes an integration control sub-system operatively coupled to the first power converter and the DC power source. The integration control sub-system includes at least one bypass switch disposed between the DC power source and the DC-link and configured to connect the DC power source to the DC-link via the second power converter or connect the DC power source directly to the DC-link by bypassing the second power converter.

In accordance with one embodiment of the present specification, a method for controlling an integration of a DC power source in a hybrid power generation system is presented. The hybrid power generation system includes a generator, a first power converter coupled to the generator and having a DC-link, and a second power converter. The method includes determining a magnitude of the reference voltage corresponding to the DC power source. The method further includes determining a minimum voltage level of the DC-link and a maximum voltage level of the DC-link, wherein the minimum voltage level and the maximum voltage level define an acceptable range of a DC-link voltage. Moreover, the method includes connecting the DC power source to the DC-link via the second power converter or connecting the DC power source directly to the DC-link by bypassing the second power converter based on the magnitude of the reference voltage and the acceptable range of a DC-link voltage.

In accordance with one embodiment of the present specification, an integration control sub-system for controlling an integration of a DC power source in a hybrid power generation system is presented. The hybrid power generation system includes a generator, a first power converter coupled to the generator and having a DC-link, and a second power converter. The integration control sub-system includes at least one bypass switch disposed between the DC power source and the DC-link. The integration control sub-system further includes a controller operatively coupled to the at least one bypass switch. The controller is configured to determine a magnitude of the reference voltage corresponding to the DC power source. The controller is further configured to determine a minimum voltage level of the DC-link and a maximum voltage level of the DC-link, wherein the minimum voltage level and the maximum voltage level define an acceptable range of a DC-link voltage. Moreover, the controller is configured to connect the DC power source to the DC-link via the second power converter or connect the DC power source directly to the DC-link by bypassing the second power converter based on the magnitude of the reference voltage and the acceptable range of a DC-link voltage.

DRAWINGS

These and other features, aspects, and advantages of the present specification will become better understood when the following detailed description is read with reference to the accompanying drawings in which like characters represent like parts throughout the drawings, wherein:

FIG. 5 is a block diagram representation of at least a portion of the hybrid power generation system of FIG. 1 or FIG. 2 employing a bypass switch and the second power converter of FIG. 3A, in accordance with one embodiment of the present specification;

FIG. 6 is a block diagram representation of at least a portion of the hybrid power generation system of FIG. 1 or FIG. 2 employing a bypass switch and the second power converter of FIG. 3B, in accordance with one embodiment of the present specification;

FIG. 7 is a block diagram representation of at least a portion of the hybrid power generation system of FIG. 1 or FIG. 2 employing a plurality of bypass switches and the second power converter of FIG. 3C, in accordance with one embodiment of the present specification;

FIG. 8 is a block diagram representation of at least a portion of the hybrid power generation system of FIG. 1 or FIG. 2 employing a plurality of bypass switches and the second power converter of FIG. 3D, in accordance with one embodiment of the present specification;

FIG. 11 is a block diagram representation of at least a portion of the hybrid power generation system of FIG. 1 or FIG. 2 employing a plurality of bypass switches and the second power converter of FIG. 4C, in accordance with one embodiment of the present specification;

Figure 1:
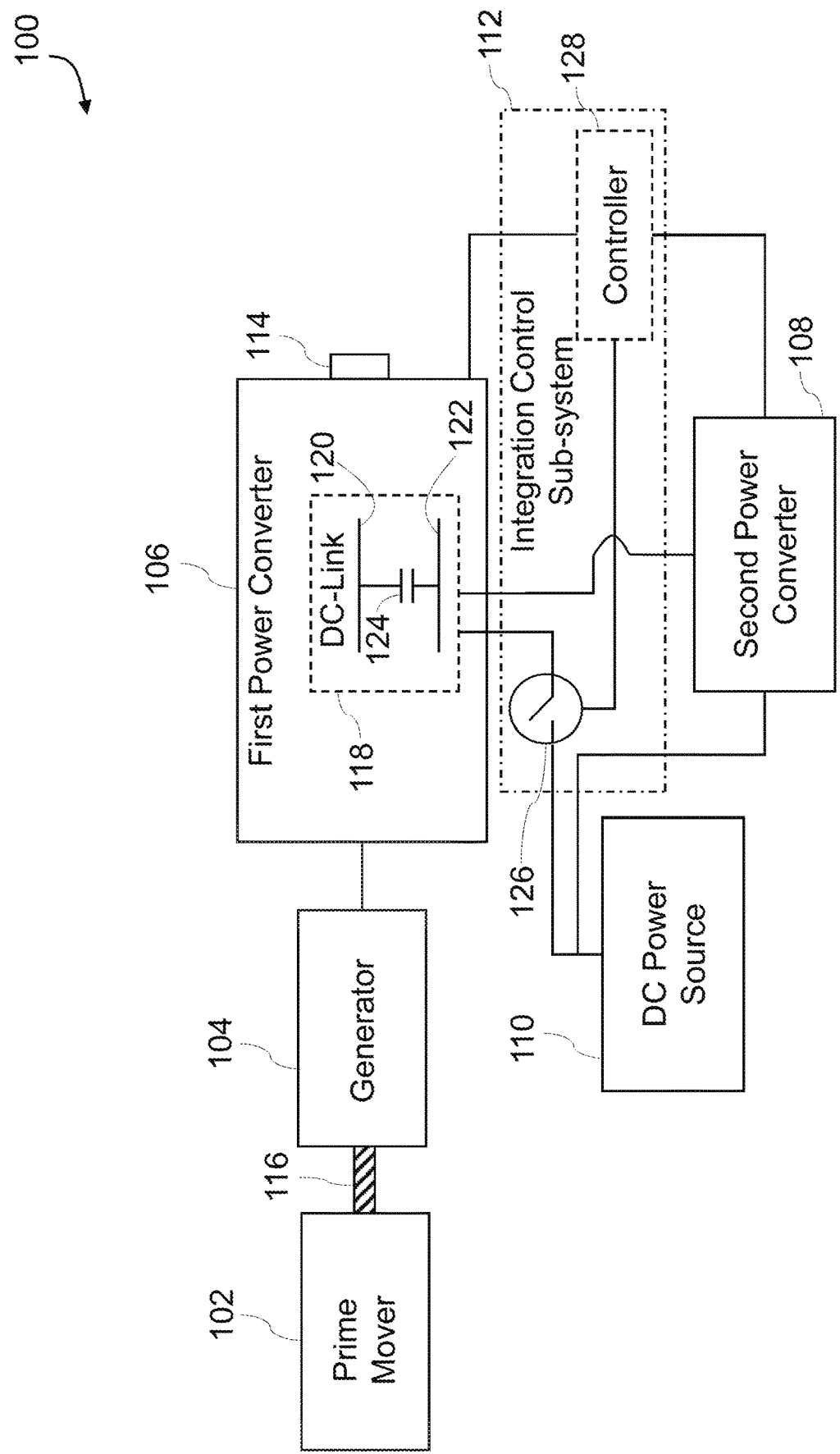
FIG. 1 is a block diagram representation of a hybrid power generation system, in accordance with one embodiment of the present specification.
Figure 2:
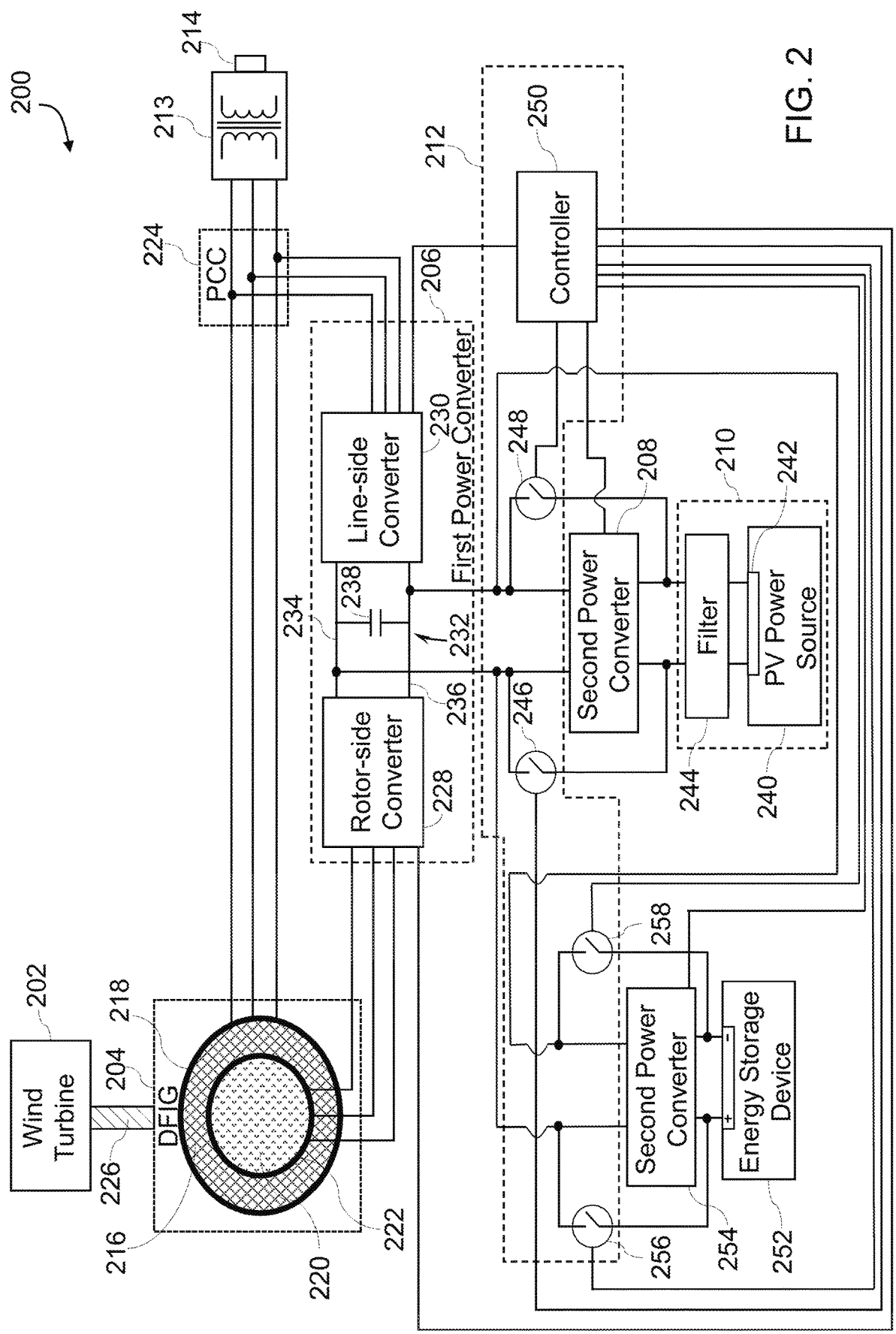
FIG. 2 is a block diagram representation of another hybrid power generation system, in accordance with one embodiment of the present specification.
Figure 4B:
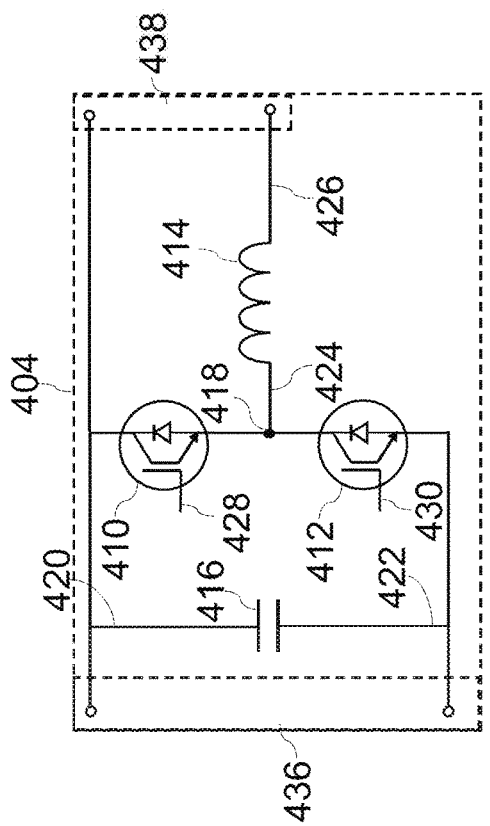
FIGS. 4A-4D are schematic representations of a second power converter used in the hybrid power generation systems of FIG. 1 and FIG. 2.
Figure 4D:
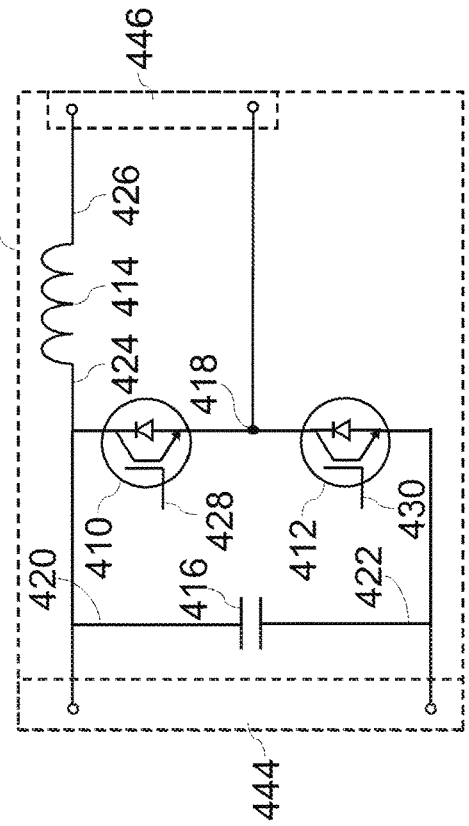
Figure 13:
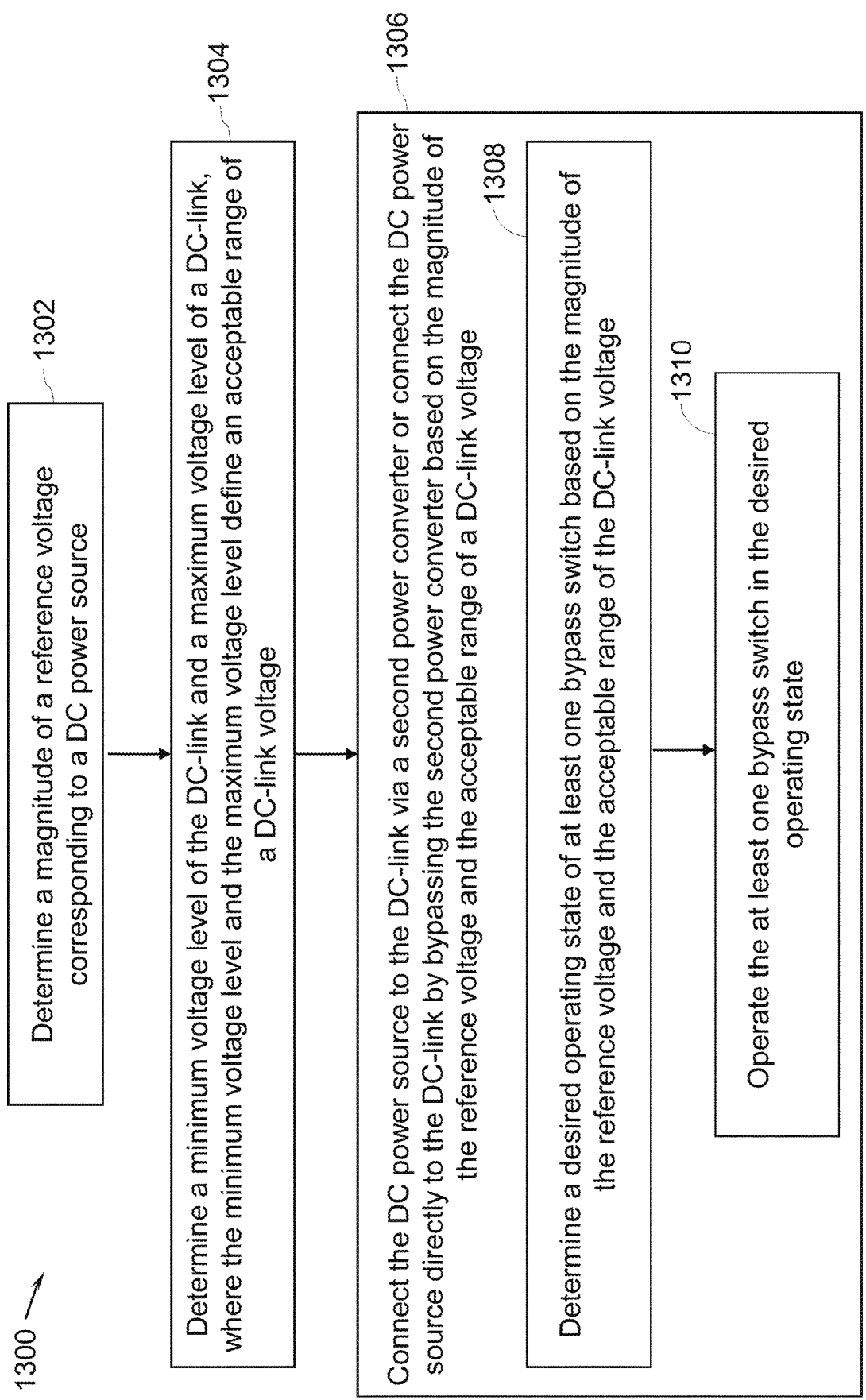

FIG. 12 is a block diagram representation of at least a portion of the hybrid power generation system of FIG. 1 or FIG. 2 employing a plurality of bypass switches and the second power converter of FIG. 4D, in accordance with one embodiment of the present specification; and FIG. 13 is a flow diagram of a method for controlling integration of a direct current (DC) power source in the hybrid power generation systems of FIG. 1 and FIG. 2, in accordance with one embodiment of the present specification.

DETAILED DESCRIPTION

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

In accordance with some embodiments of the present specification, a hybrid power generation system is presented. The hybrid power generation system includes a generator operable via a prime mover and configured to generate an alternating current (AC) power. The hybrid power generation system further includes a first power converter electrically coupled to the generator, where the first power converter includes a direct current (DC) link. Furthermore, the hybrid power generation system includes a DC power source configured to be coupled to the DC-link. Moreover, the hybrid power generation system also includes a second power converter. Additionally, the hybrid power generation system includes an integration control sub-system operatively coupled to the first power converter and the DC power source. The integration control sub-system includes at least one bypass switch disposed between the DC power source and the DC-link and configured to connect the DC power source to the DC-link via the second power converter or bypass the second power converter. The integration control sub-system and a method for controlling an integration of a DC power source in a hybrid power generation system are also presented.

FIG. 1 is a block diagram representation of a hybrid power generation system 100, in accordance with one embodiment of the present specification. The hybrid power generation system 100 includes a prime mover 102, a generator 104, a first power converter 106, a second power converter 108, a direct current (DC) power source 110, and an integration control sub-system 112. The hybrid power generation system 100 may be configured to generate an alternating current (AC) electrical power and supply the AC electrical power to an electrical grid (not shown) or an electrical load (not shown) via an output port 114 of the hybrid power generation system 100. The AC electrical power at the output port 114 may be a single phase or multi-phase, such as a three-phase electrical power. In some embodiments, the integration control sub-system 112 is configured to control integration of the DC power source 110 with the first power converter 106 to facilitate increased utilization of electrical power generated by the DC power source 110.

The prime mover 102 is configured to impart a rotational motion to rotary element (e.g., a rotor) of the generator 104. Non-limiting examples of the prime mover 102 may include a wind turbine, a tidal turbine, a hydro turbine, an engine that may be operable at variable speeds, a gas turbine, a compressor, or combinations thereof.

The generator 104 may be a synchronous generator, an asynchronous generator, or a doubly-fed induction generator. In general, the generator 104 includes a stator, a stator winding wound on the stator, a rotor, and a rotor winding wound on the rotor. The generator 104 is mechanically coupled to the prime mover 102. For example, the rotor of the generator 104 is mechanically coupled to a rotary element of the prime mover 102 via a shaft 116 such that rotations of the rotary element of the prime mover 102 cause rotations of the rotor of the generator 104.

The first power converter 106 is electrically coupled to the generator 104. By way of example, the first power converter 106 may be electrically coupled to the stator winding or the rotor winding, or both the stator winding and the rotor winding of the generator 104. In the embodiment of FIG. 1, the first power converter 106 is coupled to the stator winding of the generator 104 and implemented as a full power converter that is configured to process all the power generated by the generator 104. In some embodiments, the first power converter 106 may be implemented as a partial power converter (see FIG. 2) and configured to process at least a portion of the power generated by the generator 104. The first power converter 106 may be an AC-AC converter. The AC-AC converter may include an AC-DC converter and a DC-AC converter. The first power converter 106 includes a DC-link 118. In particular, the AC-DC converter and the DC-AC converter are coupled to each other via the DC-link 118. The DC-link 118 may include at least two conductors 120, 122—one maintained at a positive potential and another maintained at a negative potential. The DC-link 118 may also include a DC-link capacitor 124 electrically coupled between two conductors 120 and 122.

The DC power source 110 is configured to be coupled to the DC-link 118 via the integration control sub-system 112. The DC power source 110 is capable of generating and/or supplying a DC power to the DC-link 118. Non-limiting examples of the DC power source may include an energy storage device, a photovoltaic (PV) power source (see FIG. 2), a fuel cell, a renewable energy based power generator, a non-renewable energy based power generator, or combinations thereof. The energy storage device may include one or more batteries, capacitors, or a combination thereof.

In some embodiments, the second power converter 108 may be configured to be coupled between the DC power source 110 and the DC-link 118 of the first power converter 106. The second power converter 108 may be a DC-DC converter which is configured to either increase a level of the DC power generated by the DC power source 110 or decrease the level of the DC power generated by the DC power source 110. By way of example, the second power converter 108 may be a boost converter such as any of converters shown in FIGS. 3A-3D. By way of another example, the second power converter 108 may be a buck converter such as any of converters shown in FIGS. 4A-4D. Further details of the second power converter 108 is described in conjunction with FIGS. 3A-3D and 4A-4D.

In certain instances, during an operation of the hybrid power generation system 100, a power generated by the DC power source 110 may increase beyond a rated power of the second power converter 108. In a conventional hybrid power generation system, the auxiliary power source such as a DC power source is coupled to an asynchronous generator or a synchronous generator via a power converter to the asynchronous generator or the synchronous generator. In such conventional configuration, the power converter that is coupled to the auxiliary power source is selected such that a rated power of such power converter is sufficient to support maximum power generated by the auxiliary power source. Therefore, for the auxiliary power source having higher power generation capability, the corresponding power converter of increased rated power is required to be employed. Typically, such power converter of higher rated power is bulkier and costlier in comparison to a power converter of lower rated power.

In accordance with some aspects of the present specification, the hybrid power generation system 100 includes the integration control sub-system 112. The integration control sub-system 112 is operatively coupled to one or more of the first power converter 106, the second power converter 108, and the DC power source 110. The integration control sub-system 112 is configured to control integration of the DC power source 110 with the first power converter 106 to facilitate increased utilization of electrical power generated by the DC power source 110. Moreover, the integration control sub-system 112 in accordance with some embodiments of the present specification facilitates use of the second power converter 108 having reduced rated power in comparison to the power converter of the conventional hybrid power generation system. Accordingly, overall cost and space requirement of the hybrid power generation system 100 may be reduced.

The integration control sub-system 112 includes at least one bypass switch, such as a bypass switch 126. In the embodiment of FIG. 1, one bypass switch 126 is shown. It is to be noted that more than one bypass switches may also be employed (see FIG. 2), without limiting the scope of the present specification. The bypass switch 126 may be disposed between the DC power source 110 and the first power converter 106. More particularly, in certain embodiments, the bypass switch 126 may be electrically coupled between the DC power source 110 and the DC-link 118 of the first power converter 106. In some embodiments, the bypass switch 126 is configured to connect the DC power source 110 to the DC-link 118 via the second power converter 108. In some embodiments, the bypass switch 126 is configured to connect the DC power source 110 directly to the DC-link 118 by bypassing the second power converter 108.

The bypass switch 126 may be capable of being controlled electronically. In some embodiments, the bypass switch 126 may be a semiconductor switch, a contactor, a circuit breaker, or a combination there of. Non-limiting examples of such semiconductor switches may include transistors, gate commutated thyristors, field effect transistors, insulated gate bipolar transistors (IGBT), gate turn-off thyristors, static induction transistors, static induction thyristors, or combinations thereof. Moreover, materials used to form the semiconductor switch may include, but are not limited to, silicon (Si), germanium (Ge), silicon carbide (SiC), gallium nitride (GaN), gallium arsenide (GaAs) or combinations thereof.

In certain embodiments, the integration control sub-system 112 may also include a controller 128 to control integration of the DC power source 110 with the first power converter 106 to facilitate increased utilization of electrical power generated by the DC power source 110. The controller 128 may include a specially programmed general purpose computer, an electronic processor such as a microprocessor, a digital signal processor, and/or a microcontroller. Further, the controller 128 may include input/output ports, and a storage medium, such as an electronic memory. Various examples of the microprocessor include, but are not limited to, a reduced instruction set computing (RISC) architecture type microprocessor or a complex instruction set computing (CISC) architecture type microprocessor. Further, the microprocessor may be a single-core type or multi-core type. Alternatively, the controller 128 may be implemented as hardware elements such as circuit boards with processors or as software running on a processor such as a personal computer (PC), or a microcontroller. In the embodiment of FIG. 1, the controller 128 is shown as a part of the integration control sub-system 112. In certain embodiments, the controller 128 may be disposed outside the integration control sub-system 112.

The controller 128 may be coupled to the first power converter 106 and the second power converter 108 to control operations of the first power converter 106 and the second power converter 108. The controller 128 is also operatively coupled to the at least one bypass switch such as the bypass switch 126 to control integration of the DC power source 110 with the first power converter 106. In a non-limiting example, the controller 128 may be configured to execute the method of FIG. 13 to control the switching of the bypass switch 126. Further details of the operation of the controller 128 to control integration of the DC power source 110 with the first power converter 106 is described in conjunction with FIGS. 2 and 13.

FIG. 2 is a block diagram representation of another hybrid power generation system 200, in accordance with one embodiment of the present specification. In particular, the hybrid power generation system 200 is a doubly-fed induction generator (DFIG) based power generation system. In some embodiments, the hybrid power generation system 200 includes one or more of a prime mover 202, a DFIG 204, a first power converter 206, a second power converter 208, a DC power source 210, an integration control sub-system 212, and a transformer 213. The prime mover 202 of FIG. 2 is similar to the prime mover 102 of FIG. 1 and is configured to impart a rotational motion to rotary element (e.g., a rotor) of the DFIG 204. The hybrid power generation system 200 may be configured to generate an AC electrical power and supply the AC electrical power via an output power port 214 of the hybrid power generation system 200. The AC electrical power at the output power port 214 may be a single phase or multi-phase, such as a three-phase electrical power. In certain embodiments, the integration control sub-system 212 may control the electrical power generation by the hybrid power generation system 200 such that predefined Balance of Plant (BoP) limits of the transformer 213 are not violated. The BoP limits include at least one of a maximum active power limit of the transformer 213, a maximum apparent power limit of the transformer 213, a maximum apparent current limit of the transformer 213, a maximum temperature limit of the transformer 213. In some embodiments, the integration control sub-system 212 may also protect the first power converter 206 by either regulating the power output from DFIG 204 or the DC power source 210.

In some embodiments, the hybrid power generation system 200 may be connected to an electrical grid, such as, a utility electrical grid. In some embodiments, the hybrid power generation system 200 may be implemented as an islanded power generation system, sometimes also referred to as an isolated power generation system which not connected to an electric grid (not shown). By way of example, a hybrid power generation system such as the hybrid power generation system 200 may be deployed where connection to the electric grid is not desired or the electric grid is not available.

The DFIG 204 of FIG. 2 is representative of one embodiment of the generator 104 of FIG. 1. The DFIG 204 includes a stator 216, a stator winding 218 wound on the stator 216, a rotor 220, and a rotor winding 222 wound on the rotor 220. In some embodiments, both the stator winding 218 and the rotor winding 222 may be multi-phase winding such as a three-phase winding. The stator winding 218 may be coupled to a point of common coupling (PCC) 224. The DFIG 204 is mechanically coupled to the prime mover 202. For example, the rotor 220 of the DFIG 204 is mechanically coupled to a rotary element of the prime mover 202 via a shaft 226 such that rotations of the rotary element of the prime mover 202 cause rotations of the rotor 220 of the DFIG 204.

The rotor 220 of the DFIG 204 is operated at a rotational speed which may be a synchronous speed, a sub-synchronous speed, or a super-synchronous speed depending on the rotational speed of the rotary element of the prime mover 202. In one example, the synchronous speed of the rotor 220 may be defined using equation (1).

$$N_s = \frac{120 * F}{p} \qquad \text{Equation (1)}$$

where $N_s$ represents the synchronous speed of the rotor 220, p represents poles in the rotor 220, and F represents a frequency of a grid voltage. Accordingly, a sub-synchronous speed of the rotor 220 may be defined as a speed that is lower than the synchronous speed of the rotor 220. Similarly, a super-synchronous speed of the rotor 220 may be defined as any speed that is higher than the synchronous speed of the rotor 220.

During operation, the DFIG 204 is configured to generate the electrical power at the stator winding 218 depending on the rotational speed of the rotor 220. The electrical power that is generated at the stator winding 218 is hereinafter alternatively referred to as a "stator power." Further, the DFIG 204 is configured to generate or absorb electrical power at the rotor winding 222 depending on the rotational speed of the rotor 220. For example, the DFIG 204 is configured to generate electrical power at the rotor winding 222 when the rotor 220 is operated at a super-synchronous speed. The DFIG 204 is configured to absorb the electrical power at the rotor winding 222 when the rotor 220 is operated at a sub-synchronous speed. The electrical power that is generated or absorbed at the rotor winding 222 is hereinafter alternatively referred to as a "slip power." The magnitude of the slip power is dependent on a slip value of the DFIG 204.

The first power converter 206 is coupled to the DFIG 204 and the PCC 224. In particular, the first power converter 206 is coupled between the rotor winding 222 and the PCC 224. In some embodiments, the first power converter 206 includes a rotor-side converter 228 and a line-side converter 230. The rotor-side converter 228 is coupled to the rotor winding 222 of the DFIG 204. The line-side converter 230 is coupled to the PCC 224, directly or via a transformer (not shown). The rotor-side converter 228 may be an AC-DC converter and configured to convert an AC power into a DC power and vice-versa. The line-side converter 230 may be a DC-AC converter and configured to convert the DC power into an AC power and vice-versa. Each of the rotor-side converter 228 and the line-side converter 230 may include one or more switches, for example, semiconductor switches, configured to facilitate power conversion from AC to DC and vice-versa. The semiconductor switches may be controlled by supplying control signals to respective control terminal (e.g., gate terminal) of the semiconductor switches.

The rotor-side converter 228 and the line-side converter 230 are coupled to each other via a DC-link 232. The DC-link 232 may be representative of one embodiment of the DC-link 118 of FIG. 1. The DC-link 232 may include at least two conductors 234, 236—one maintained at a positive potential and another maintained at a negative potential. The DC-link 232 may also include a DC-link capacitor 238 electrically coupled between two conductors 234 and 236.

The DC power source 210 may be representative of one embodiment of the DC power source 110 of FIG. 1. The DC power source 210 is coupled to the DC-link 232 and configured to generate DC power. In some embodiments, the DC power source 210 includes a PV power source 240 having an output power port 242. The PV power source 240 may include one or more PV arrays, where each PV array may include at least one PV module. A PV module may include a suitable arrangement of a plurality of PV cells. The PV power source 240 may generate a DC voltage/current depending on solar insolation, weather conditions, and/or time of the day. In certain embodiments, the DC power source 210 may also include a filter 244. The filter 244 may be coupled to the output port 242 of the PV power source 240. The filter 244 may be an electronic power filter. By way of example, the filter 244 may include a common mode filter, a differential filter, or both.

In some embodiments, the second power converter 208 may be configured to be coupled between the DC power source 210 and the DC-link 232 of the first power converter 206. The second power converter 208 may be a DC-DC converter which is configured to either increase a level of the DC power generated by the DC power source 110 or decrease the level of the DC power generated by the DC power source 110. Further details of the second power converter 208 is described in conjunction with FIGS. 3A-3D and 4A-4D.

In certain embodiments, the hybrid power generation system 200 may also include another DC power source such as an energy storage device 252, alternatively or in addition to the DC power source 210. The energy storage device 252 may include one or more batteries, capacitors, or a combination thereof. Moreover, the hybrid power generation system 200 may also include another second power converter 254 that may be coupled between the DC-link 232 and the energy storage device 252.

In accordance with aspects of the present specification, the hybrid power generation system 200 includes the integration control sub-system 212 (shown using a dashed region). The integration control sub-system 212 is operatively coupled to one or more of the first power converter 206, the second power converter 208, and the DC power source 210. The integration control sub-system 212 controls integration of the DC power source 210 with the DC-link 232 to increase the utilization of the DC power generated by the DC power source 210.

The integration control sub-system 212 includes at least one bypass switch, such as bypass switches 246, 248. Although two bypass switches 246, 248 are shown in the integration control sub-system 212 of FIG. 2, one or more bypass switches may be employed without limiting the scope of the present specification. As depicted in FIG. 2, the bypass switches 246, 248 are disposed between the DC power source 210 and the DC-link 232. More particularly, the bypass switches 246, 248 are connected between the filter 244 and the DC-link 232. The bypass switches 246, 248 are configured to connect the DC power source 210 to the DC-link 232 via the second power converter 208 or connect the DC power source 210 directly to the DC-link 232 by bypassing the second power converter 208.

In certain embodiments, the integration control sub-system 212 may also include bypass switches 256, 258. As depicted in FIG. 2, the bypass switches 256, 258 are connected between the energy storage device 252 and the DC-link 232. The bypass switches 256, 258 are configured to connect the energy storage device 252 to the DC-link 232 via the second power converter 254 or connect the energy storage device 252 directly to the DC-link 232 by bypassing the second power converter 254. The bypass switches 246, 248, 256, 258 may be representative of one embodiment of the bypass switch 126 of FIG. 1.

Moreover, the integration control sub-system 212 also includes a controller 250 to control integration of the DC power source 210 with the first power converter 206 to facilitate increased utilization of electrical power generated by the DC power source 210. The controller 250 may be similar to the controller 128 of FIG. 1. The controller 250 may be coupled to the rotor-side converter 228, the line-side converter 230, the first power converter 206 and the second power converter 208 to control respective operations. The controller 250 is also operatively coupled to the bypass switches 246, 248 to control switching of the bypass switches 246, 248. The controller 250 may also be operatively coupled to the bypass switches 256, 258 to control switching of the bypass switches 256, 258. In a non-limiting example, the controller 128 may be configured to execute the method of FIG. 13 or 14 to control the switching of the bypass switches 246, 248, 256, 258. Further details of the operation of the controller 250 to control integration of the DC power source 210 with the first power converter 206 is described in conjunction with FIGS. 2, 13, and 14.

FIGS. 3A-3D are schematic representations of a second power converter 302, 304, 306, 308 that may be used in the hybrid power generation systems of FIG. 1 and FIG. 2. The second power converters 302-308 of FIGS. 3A-3D are representative of different embodiments of the second power converters 108 and 208 used in the hybrid power generation systems 100, 200 of FIG. 1 and FIG. 2, respectively. Each of the second power converter 302-308 are boost converters that are operated to enhance a level of the DC power received from the DC power source 110, 210. In some embodiments, each of the second power converters 302-308 may include a plurality of converter switches such as switches 310, 312, an inductor 314, and a capacitor 316. Although, in FIGS. 3A-3D, the converter switches 310, 312 are shown as IGBTs, other types of semiconductor switches such as the transistors, gate commutated thyristors, field effect transistors, gate turn-off thyristors, static induction transistors, static induction thyristors, or combinations thereof, may also be used as converter switches 310, 312. Each of the converter switches 310, 312 includes three terminals—an emitter terminal, a collector terminal, and a control terminal. The capacitor 316 includes two terminals 320, 322. Moreover, the inductor 314 includes two terminals 324, 326.

In each of the second power converters 302-308, the two terminals 320, 322 of the capacitor 316 may be configured as inputs ports 332, 336, 340, and 344 of the second power converters 302, 304, 306, and 308, respectively. Further, the collector terminal of the controller switch 310 and the emitter terminal of the controller switch 312 are configured as output ports 334, 338, 342, and 346 of the second power converters 302, 304, 306, and 308, respectively. Moreover, the emitter terminal of the controller switch 310 is connected to the collector terminal of the controller switch 312 at an interconnection point 318. Reference numerals 328 and 330 represent the control terminals (e.g., gate terminals) of the controller switches 310 and 312, respectively. The control terminals 328, 330 are coupled to the controller 128 or 250 to receive control signals. The controller switches 310, 312 may be turned-on or turned-off depending the control signals.

The inductor 314 and the capacitor 316 may be arranged in different fashions in the second power converters 302-308. By way of example, in the second power converter 302 of FIG. 3A, the terminal 322 of the capacitor 316 is connected to the emitter terminal of the controller switch 312 and the terminal 320 of the capacitor 316 is connected to the terminal 324 of the inductor 314. Moreover, the terminal 326 of the inductor 314 is connected to the interconnection point 318.

Figure 3B:
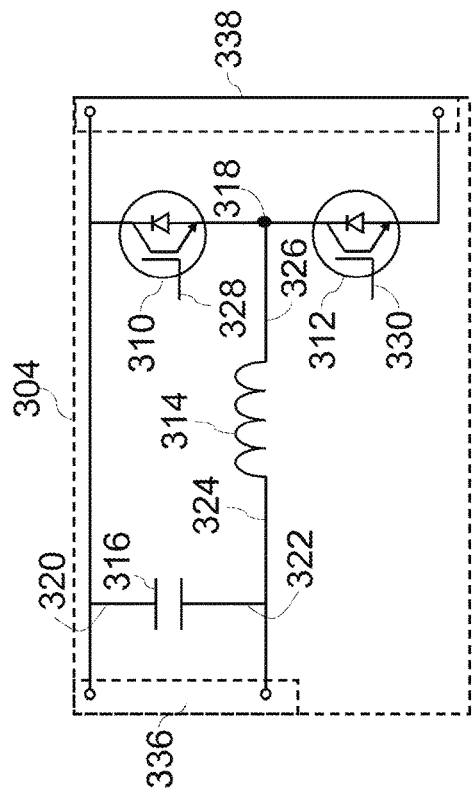
FIGS. 3A-3D are schematic representations of a second power converter used in the hybrid power generation systems of FIG. 1 and FIG. 2.

In the second power converter 304 of FIG. 3B, the terminal 322 of the capacitor 316 is connected to the terminal 324 of the inductor 314 and the terminal 320 of the capacitor 316 is connected to the collector terminal of the controller switch 310. Also, a terminal 326 of the inductor 314 is connected to the interconnection point 318.

Figure 3D:
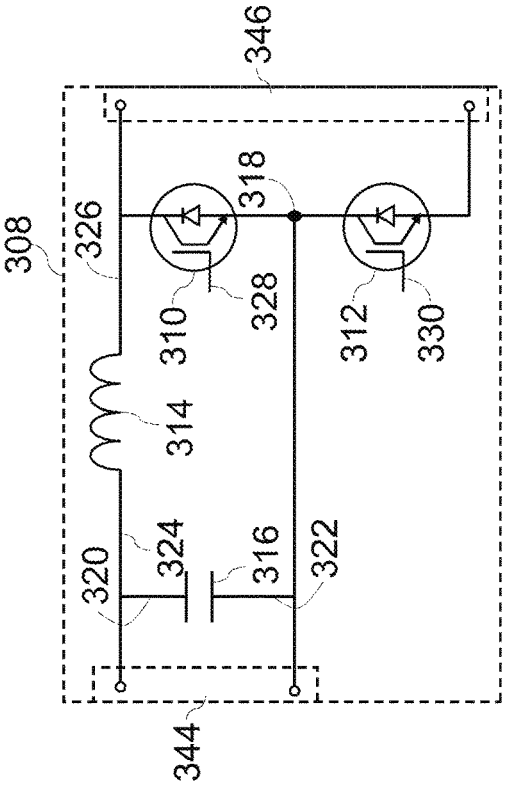
Figure 3A:
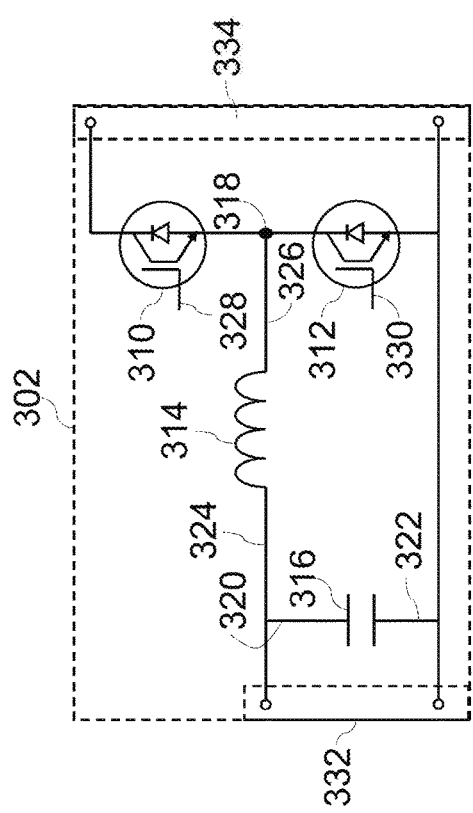
Figure 3C:
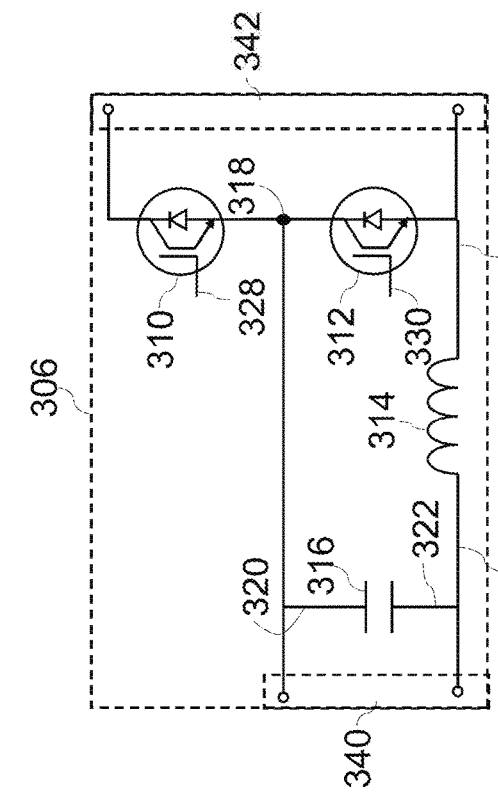

Moreover, in the second power converter 306 of FIG. 3C, the terminal 320 of the capacitor 316 is connected to the interconnection point 318. The terminal 326 of the inductor 314 is connected to the emitter terminal of the controller switch 312 and the terminal 324 of the inductor 314 is connected to the terminal 322 of the capacitor 316.

Furthermore, in the second power converter 308 of FIG. 3D, the terminal 322 of the capacitor 316 is connected to the interconnection point 318. The terminal 326 of the inductor 314 is connected to the collector terminal of the controller switch 310 and the terminal 324 of the inductor 314 is connected to the terminal 320 of the capacitor 316.

FIGS. 4A-4D are schematic representations of a second power converter 402, 404, 406, 408 that may be used in the hybrid power generation systems of FIG. 1 and FIG. 2. The second power converters 402-408 of FIGS. 4A-4D are representative of different embodiments of the second power converters 108 and 208 used in the hybrid power generation systems 100, 200 of FIG. 1 and FIG. 2, respectively. Each of the second power converter 402-408 are buck converters that are operated to reduce a level of the DC power received from the DC power source 110, 210. In some embodiments, each of the second power converters 402-408 may include a plurality of converter switches, such as switches 410, 412, an inductor 414, and a capacitor 416. In some embodiments, the switches 410, 412, the inductor 414, and the capacitor 416 of FIGS. 4A-4D may be similar to the corresponding elements of the FIGS. 3A-3D. Each of the converter switches 410, 412 includes three terminals—an emitter terminal, a collector terminal, and a control terminal. The capacitor 416 includes two terminals 420, 422. Moreover, the inductor 414 includes two terminals 424, 426.

In each of the second power converters 402-408, the emitter terminal of the controller switch 410 is connected to the collector terminal of the controller switch 412 at an interconnection point 418. Reference numerals 428 and 430 represent control terminals (e.g., gate terminals) of the controller switches 410 and 412, respectively. The control terminals 428, 430 are coupled to the controller 128 or 250 to receive control signals. The controller switches 410, 412 may be turned-on or turned-off depending on the control signals. Moreover, the capacitor 416 is connected across the controller switches 410, 412. More particularly, the terminal 420 of the capacitor 416 is connected to the collector terminal of the controller switch 410 and the terminal 422 of the capacitor 416 is connected to the emitter terminal of the controller switch 412. Furthermore, the terminals 420 and 422 of the capacitor 416 define input ports 432, 436, 440, and 444 of the second power converters 402, 404, 406, and 408, respectively.

The inductor 414 may be arranged in different fashions in the second power converters 402-408. By way of example, in the second power converter 402 of FIG. 4A, the terminal 424 of the inductor 414 is connected to the interconnection point 418. Moreover, the terminal 426 of the inductor 414 and the emitter terminal of the controller switch 412 define an output port 434 of the second power converter 402. In the second power converter 404 of FIG. 4B, the terminal 424 of the inductor 414 is connected to the interconnection point 418. Moreover, the terminal 426 of the inductor 414 and the collector terminal of the controller switch 410 define an output port 438 of the second power converter 404. In the second power converter 406 of FIG. 4C, the terminal 424 of the inductor 414 is connected to the emitter terminal of the controller switch 412. Moreover, the terminal 426 of the inductor 414 and the interconnection point 418 define an output port 442 of the second power converter 406. In the second power converter 408 of FIG. 4D, the terminal 424 of the inductor 414 is connected to the collector terminal of the controller switch 410. Moreover, the terminal 426 of the inductor 414 and the interconnection point 418 define an output port 446 of the second power converter 408.

FIGS. 5-12 show different embodiments showing arrangements of bypass switches in the power generations systems of FIG. 1 and FIG. 2. For ease of illustration, FIGS. 5-12 are described with reference to the hybrid power generation system 100 of FIG. 1. It is to be noted that configurations of FIGS. 5-12 are also applicable to the hybrid power generation system 200 of FIG. 2.

Referring now to FIG. 5, a block diagram representation 500 of at least a portion of the hybrid power generation system of FIG. 1 or FIG. 2 employing a bypass switch and the second power converter 302 of FIG. 3A is presented, in accordance with one embodiment of the present specification. In the embodiment of FIG. 5, the bypass switch 126 is coupled between the DC power source 110 and the DC-link 118 of the first power converter 106 (not shown in FIG. 5). More particularly, the bypass switch 126 is coupled between the terminal 320 of the capacitor 316 and the collector terminal of the controller switch 310 of the second power converter 302.

FIG. 6 is a block diagram representation 600 of at least a portion of the hybrid power generation system of FIG. 1 or FIG. 2 employing a bypass switch and the second power converter 304 of FIG. 3B, in accordance with one embodiment of the present specification. In the embodiment of FIG. 6, the bypass switch 126 is coupled between the DC power source 110 and the DC-link 118 of the first power converter 106 (not shown in FIG. 6). More particularly, the bypass switch 126 is coupled between the terminal 322 of the capacitor 316 and the emitter terminal of the controller switch 312 of the second power converter 304.

FIG. 7 is a block diagram representation 700 of at least a portion of the hybrid power generation system of FIG. 1 or FIG. 2 employing a plurality of bypass switches and the second power converter 306 of FIG. 3C, in accordance with one embodiment of the present specification. In the embodiment of FIG. 7, two bypass switches 126 are employed. The bypass switches 126 are coupled between the DC power source 110 and the DC-link 118 of the first power converter 106 (not shown in FIG. 7). More particularly, while one bypass switch 126 is coupled between the terminal 320 of the capacitor 316 and the collector terminal of the controller switch 310, another bypass switch 126 is coupled between the terminal 322 of the capacitor 316 and the emitter terminal of the controller switch 312 of the second power converter 306.

FIG. 8 is a block diagram representation 800 of at least a portion of the hybrid power generation system of FIG. 1 or FIG. 2 employing a plurality of bypass switches and the second power converter 308 of FIG. 3D, in accordance with one embodiment of the present specification. In the embodiment of FIG. 8 also, two bypass switches 126 are employed. The bypass switches 126 are coupled between the DC power source 110 and the DC-link 118 of the first power converter 106 (not shown in FIG. 8). More particularly, while one bypass switch 126 is coupled between the terminal 320 of the capacitor 316 and the collector terminal of the controller switch 310, another bypass switch 126 is coupled between the terminal 322 of the capacitor 316 and the emitter terminal of the controller switch 312 of the second power converter 308.

Figure 4A:
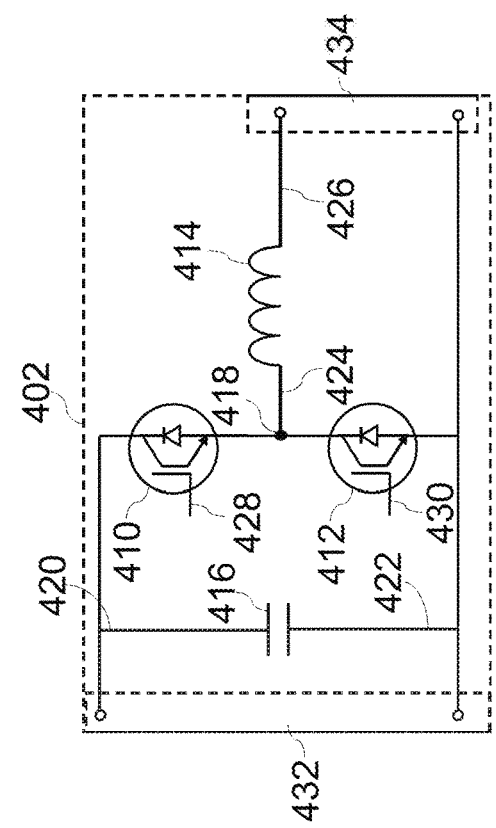
Figure 9:
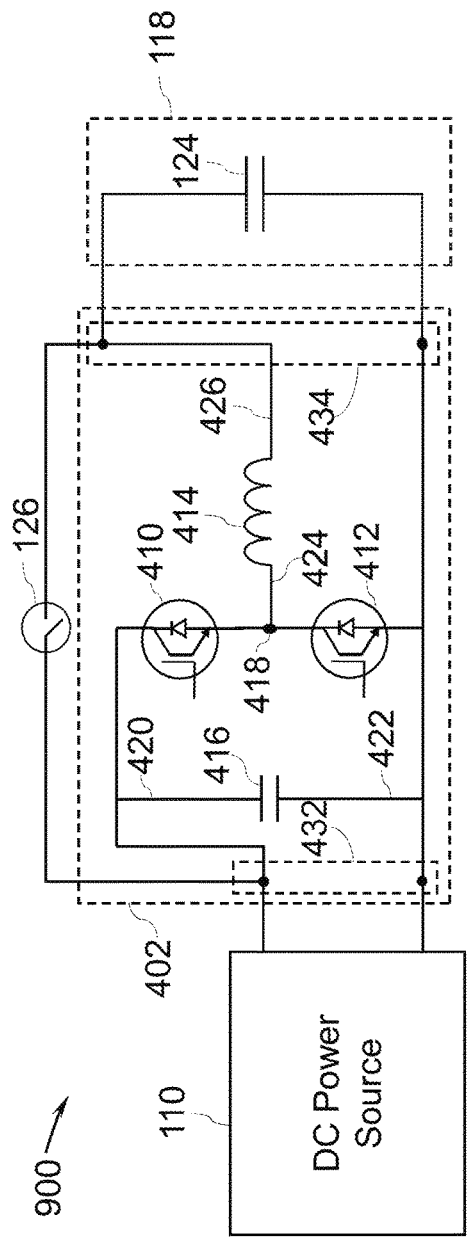
FIG. 9 is a block diagram representation of at least a portion of the hybrid power generation system of FIG. 1 or FIG. 2 employing a bypass switch and the second power converter of FIG. 4A, in accordance with one embodiment of the present specification.

Referring now to FIG. 9, a block diagram representation 900 of at least a portion of the hybrid power generation system of FIG. 1 or FIG. 2 employing a bypass switch and the second power converter 402 of FIG. 4A is presented, in accordance with one embodiment of the present specification. In the embodiment of FIG. 9, the bypass switch 126 is coupled between the DC power source 110 and the DC-link 118 of the first power converter 106 (not shown in FIG. 9). More particularly, the bypass switch 126 is coupled between the terminal 420 of the capacitor 416 and the terminal 426 of the inductor 414 of the second power converter 402.

Figure 10:
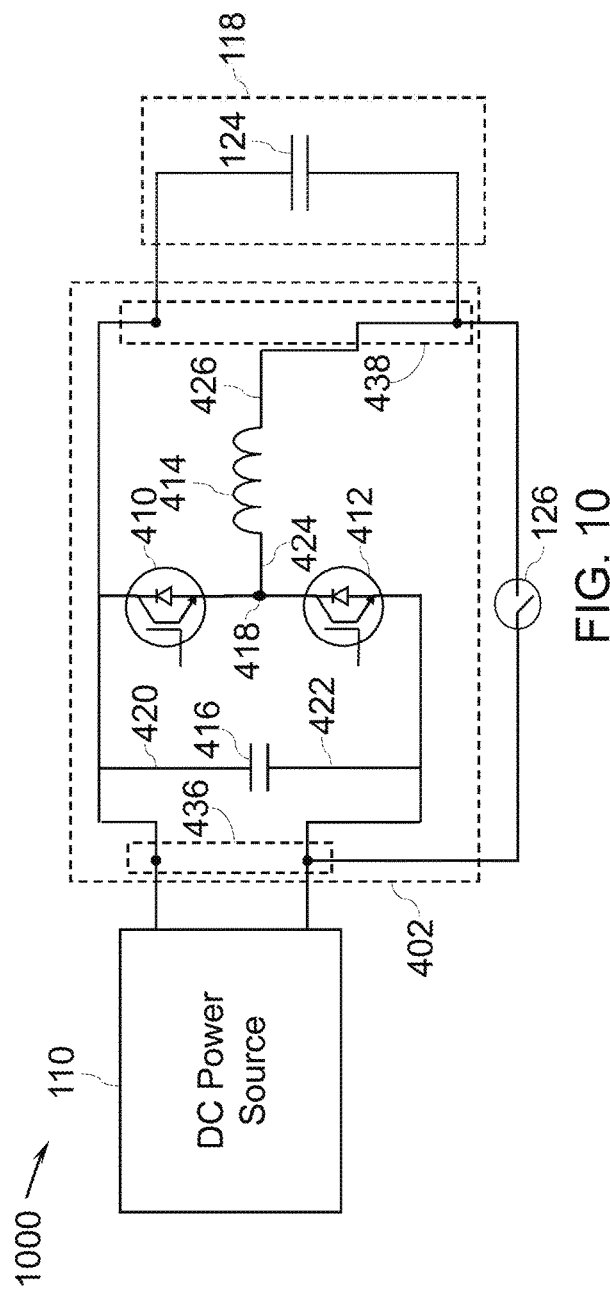
FIG. 10 is a block diagram representation of at least a portion of the hybrid power generation system of FIG. 1 or FIG. 2 employing a bypass switch and the second power converter of FIG. 4B, in accordance with one embodiment of the present specification.

FIG. 10 is a block diagram representation 1000 of at least a portion of the hybrid power generation system of FIG. 1 or FIG. 2 employing a bypass switch and the second power converter 404 of FIG. 4B, in accordance with one embodiment of the present specification. In the embodiment of FIG. 10, the bypass switch 126 is coupled between the DC power source 110 and the DC-link 118 of the first power converter 106 (not shown in FIG. 10). More particularly, the bypass switch 126 is coupled between the terminal 422 of the capacitor 416 and the terminal 426 of the inductor 414 of the second power converter 404.

Figure 4C:
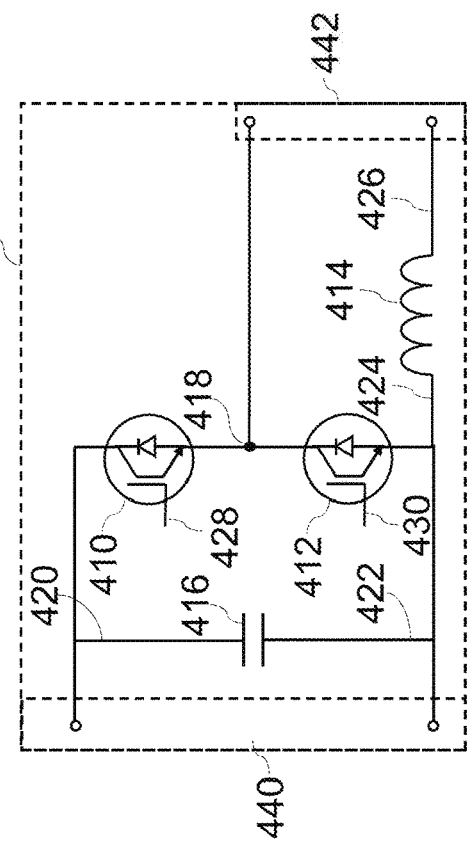

FIG. 11 is a block diagram representation 1100 of at least a portion of the hybrid power generation system of FIG. 1 or FIG. 2 employing a plurality of bypass switches and the second power converter 406 of FIG. 4C, in accordance with one embodiment of the present specification. In the embodiment of FIG. 11, two bypass switches 126 are employed. The bypass switches 126 are coupled between the DC power source 110 and the DC-link 118 of the first power converter 106 (not shown in FIG. 11). More particularly, while one bypass switch 126 is coupled between the terminal 420 of the capacitor 416 and the interconnection point 418, another bypass switch 126 is coupled between the terminal 422 of the capacitor 316 and the terminal 426 of the inductor 414 of the second power converter 406.

FIG. 12 is a block diagram representation 1200 of at least a portion of the hybrid power generation system of FIG. 1 or FIG. 2 employing a plurality of bypass switches and the second power converter 408 of FIG. 4D, in accordance with one embodiment of the present specification. In the embodiment of FIG. 12, two bypass switches 126 are employed. The bypass switches 126 are coupled between the DC power source 110 and the DC-link 118 of the first power converter 106 (not shown in FIG. 11). More particularly, while one bypass switch 126 is coupled between the terminal 420 of the capacitor 416 and the terminal 426 of the inductor 414, another bypass switch 126 is coupled between the terminal 422 of the capacitor 416 and the interconnection point 418 between the controller switches 410 and 412.

FIG. 13 is a flow diagram 1300 of a method for controlling the integration of the direct current (DC) power source 110, 210 in the hybrid power generation systems 100, 200 of FIG. 1 and FIG. 2, in accordance with one embodiment of the present specification. It is to be noted that while FIG. 13 is described with reference to the hybrid power generation system 100 of FIG. 1, the method of FIG. 3 is also applicable to the hybrid power generation system 200 of FIG. 2.

At step 1302, the controller 128 is configured to determine a magnitude of a reference voltage corresponding to the DC power source 110. In some embodiments, the controller 128 may determine the magnitude of the reference voltage based on a desired output power of the DC power source 110. By way of example, if the DC power source 110 includes a PV power source, an output power from the DC power source 110 may be controlled by regulating a voltage at output terminals of the DC power source 110. In some embodiments, the controller 128 may determine an available DC power using known maximum power point tracker (MMPT) techniques. In some embodiments, the controller 128 may also be connected to external insolation sensors and configured to receive feedback signals from the external insolation sensors. Moreover, the controller 128 determines the maximum DC power source depending on various system rating constraints and external commands. The controller 128 may then determine a power set-point for the DC power source 110 which includes the magnitude of the reference voltage. Moreover, the controller 128 may send control signals to the controller switches (see FIGS. 5-12) of the second power converter 108 such that a magnitude of a voltage across the capacitor (see FIGS. 5-12) is equivalent to the magnitude of the reference voltage determined by the controller 128.

At step 1304, the controller 128 is configured to determine a minimum voltage level of the DC-link 118 and a maximum voltage level of the DC-link 118. The minimum voltage level and the maximum voltage level define an acceptable range of a DC-link voltage. The acceptable range of a DC-link voltage is a variable range. In some embodiments, the controller 128 may determine the minimum voltage level of the DC-link 118 based on a voltage at the output port 114 of the hybrid power generation system 100. In a configuration when the hybrid power generation system 100 is connected to the electrical grid, the minimum voltage level of the DC-link 118 is determined based on a magnitude of a grid voltage ($V_{grid}$).

In some embodiments, the controller 128 may determine the maximum voltage level ($V_{DCmax}$) of the DC-link 118 based on voltage ratings of the components, for example, semiconductor devices and/or DC link capacitor 124 used in the first power converter 106. Moreover, at step 1306, the controller 128 may be configured to connect the DC power source 110 to the DC-link 118 via the second power converter 108 or connect the DC power source 110 directly to the DC-link 118 by bypassing the second power converter 108 based on the magnitude of the reference voltage and the acceptable range of a DC-link voltage. The step 13006 includes sub-steps 1308 and 1310.

At sub-step 1308, the controller 128 is configured to determine a desired operating state of the at least one bypass switch such as the bypass switch 126 based on the magnitude of the reference voltage (determined at step 1302) and the acceptable range of the DC-link voltage (determined at step 1304). The desired operating state may be a conducting state or a non-conducting state. In the conducting state, the bypass switch 126 allows electrical current to flow therethrough. In the conducting state, the bypass switch 126 does not allow the electrical current to flow therethrough. In some embodiments, the determination of the operating state of the bypass switch 126 at sub-step 1308 may depend on a type of the second power converter 108 such as a boost converter (see FIGS. 3A-3D) or a buck converter (see FIGS. 4A-4D).

In some embodiments, when the second power converter 108 is a boost converter, such as, any of the second power converters 302-308 of FIGS. 3A-3D and if the magnitude of the reference voltage is within the acceptable range of the DC-link voltage (determined at step 1304), the controller 128 may select the conducting state as the desired operating state of the bypass switch 126. Whereas, if the magnitude of the reference voltage (determined at step 1302) is less than the minimum voltage level ($V_{DCmin}$) of the DC-link 118 (determined at step 1304), the controller 128 may select the non-conducting state as the desired operating state of the bypass switch 126.

In some embodiments, when the second power converter 108 is a buck converter, for example, any of the second power converters 402-408 of FIGS. 4A-4D and if the magnitude of the reference voltage (determined at step 1302) is within the acceptable range of the DC-link voltage (determined at step 1304), the controller 128 may select the conducting state as the desired operating state of the bypass switch 126. Whereas, if the magnitude of the reference voltage (determined at step 1302) is more than the maximum voltage level ($V_{DCmax}$) of the DC-link 118 (determined at step 1304), the controller 128 may select the non-conducting state as the desired operating state of the bypass switch 126.

At sub-step 1310, the controller 128 is configured to operate the at least one bypass switch such as the bypass switch 126 in the desired operating state determined at sub-step 1308. At sub-step 1308, if the desired operating state is selected as the non-conducting state, the controller 128 may be configured to operate the at least one bypass switch such as the bypass switch 126 in the non-conducting state. More particularly, when the bypass switch 126 is operated in the conducting state, the DC power source 110 is connected to the DC-link 118 via the second power converter 108. At sub-step 1308, if the desired operating state is selected as the conducting state, the controller 128 may be configured to operate the at least one bypass switch such as the bypass switch 126 in the conducting state. More particularly, when the bypass switch is operated in the conducting state, the DC power source 110 is connected directly to the DC-link 118 by bypassing the second power converter 108.

To operate the bypass switch 126 in the desired operating state, the controller 128 may send a control signal based on the desired operating state to the bypass switch 126. More particularly, the controller 128 may send the control signal to a control terminal of the bypass switch 126. In a non-limiting example, as will be appreciated, if the bypass switch 126 is an IGBT, the controller 128 may send the control signal to a gate terminal of the bypass switch 126 depending of the type of IGBT, for example, N-channel IGBT or P-channel IGBT.

Any of the foregoing steps may be suitably replaced, reordered, or removed, and additional steps may be inserted, depending on the needs of an application.

In accordance with the embodiments described herein, the hybrid power generation system configurations facilitating enhanced electrical power output are provided. In particular, the integration control sub-system 112, 212 controls the integration of the DC power source 110, 210 with the first power converter 106, 206 to facilitate increased utilization of electrical power generated by the DC power source 110, 210. By way of example, depending on a type (e.g., boost converter or buck converter) of the second power converter 108, 208, the DC power source 110, 210 is connected directly to the DC-link 118, 232 thereby bypassing the second power converter 108, 208. Such bypassing of the second power converter 108, 208 aids in circumventing the limitations imposed by the rated power of the second power converter 108, 208. Consequently, the electrical power production by the power generation is enhanced leading to an increased AEP. In addition, due to increase in the electrical power production cost of electrical power production per unit of the electrical power decreases.

It will be appreciated that variants of the above disclosed and other features and functions, or alternatives thereof, may be combined to create many other different applications. Various unanticipated alternatives, modifications, variations, or improvements therein may be subsequently made by those skilled in the art and are also intended to be encompassed by the following claims.

The invention claimed is:

1. A hybrid power generation system, comprising:
a generator operable via a prime mover and configured to generate an alternating current (AC) power;
a first power converter electrically coupled to the generator, wherein the first power converter comprises a direct current (DC) link;
a DC power source configured to be coupled to the DC-link;
a second power converter; and
an integration control sub-system operatively coupled to the first power converter and the DC power source, wherein the integration control sub-system comprises at least one bypass switch disposed between the DC power source and the DC-link and configured to connect the DC power source to the DC-link via the second power converter or connect the DC power source directly to the DC-link by bypassing the second power converter.

2. The hybrid power generation system of claim 1, wherein the generator comprises a synchronous generator, an asynchronous generator, or a doubly-fed induction generator.

3. The hybrid power generation system of claim 1, wherein the first power converter comprises an AC-DC converter and a DC-AC converter, wherein the DC-AC converter is coupled to the AC-DC converter via the DC-link.

4. The hybrid power generation system of claim 3, wherein the DC power source comprises a photovoltaic power source comprising an output power port.

5. The hybrid power generation system of claim 4, wherein the DC power source further comprises a filter coupled to the output power port of the photovoltaic power source.

6. The hybrid power generation system of claim 5, wherein the at least one bypass switch is coupled between the filter and the DC-link.

7. The hybrid power generation system of claim 1, further comprising a controller operatively coupled to one or more of the first power converter, the DC power source, the second power converter, and the at least one bypass switch, wherein the controller is configured to control switching of the at least one bypass switch based at least on a magnitude of a reference voltage corresponding to the DC power source.

8. The hybrid power generation system of claim 7, wherein the controller is configured to determine the magnitude of the reference voltage corresponding to the DC power source using at least one of a maximum power point tracker (MMPT) technique and a desired output power of the DC power source.

9. The hybrid power generation system of claim 8, wherein the controller is further configured to:
determine a minimum voltage level of the DC-link and a maximum voltage level of the DC-link, wherein the minimum voltage level and the maximum voltage level define an acceptable range of a DC-link voltage;
determine a desired operating state of the at least one bypass switch based on the magnitude of the reference voltage and the acceptable range of the DC-link voltage, wherein the desired operating state comprises a conducting state or a non-conducting state; and
operate the at least one bypass switch in the desired operating state.

10. The hybrid power generation system of claim 9, wherein the controller is configured to select the conducting state as the desired operating state if the magnitude of the reference voltage is within the acceptable range of the DC-link voltage.

11. The hybrid power generation system of claim 9, wherein the controller is configured to select the non-conducting state as the desired operating state if the magnitude of the reference voltage is less than the minimum voltage level of the DC-link.

12. The hybrid power generation system of claim 9, wherein the controller is configured to select the non-conducting state as the desired operating state if the magnitude of the reference voltage is more than the maximum voltage level of the DC-link.

13. A method for controlling an integration of a DC power source in a power generation system, wherein the power generation system comprises a generator, a first power convener coupled to the generator and comprising a direct current (DC) link, and a second power converter, the method comprising:

determining a magnitude of a reference voltage corresponding to the DC power source;

determining a minimum voltage level of the DC-link and a maximum voltage level of the DC-link, wherein the minimum voltage level and the maximum voltage level define an acceptable range of a DC-link voltage; and connecting the DC power source to the DC-link via the second power converter or connecting the DC power source directly to the DC-link by bypassing the second power converter based on the magnitude of the reference voltage and the acceptable range of a DC-link voltage.

14. The method of claim 13, wherein determining the magnitude of the reference voltage comprises determining the magnitude of the reference voltage using at least one of a maximum power point tracker (MMPT) technique and a desired output power of the DC power source.

15. The method of claim 14, wherein connecting the DC power source to the DC-link via the second power converter or connecting the DC power source directly to the DC-link comprises:

determining a desired operating state of the at least one bypass switch based on the magnitude of the reference voltage and the acceptable range of the DC-link voltage, wherein the desired operating state comprises a conducting state or a non-conducting state; and operating the at least one bypass switch in the desired operating state.

16. The method of claim 15, wherein determining the desired operating state comprises selecting the conducting state as the desired operating state if the magnitude of the reference voltage is within the acceptable range of the DC-link voltage.

17. The method of claim 15, wherein determining the desired operating state comprises selecting the non-conducting state as the desired operating state if the magnitude of the reference voltage is less than the minimum voltage level of the DC-link.

18. The method of claim 15, wherein determining the desired operating state comprises selecting the non-conducting state as the desired operating state if the magnitude of the reference voltage is more than the maximum voltage level of the DC-link.

19. An integration control sub-system for controlling an integration of a DC power source in a power generation system, wherein the power generation system comprises a generator, a first power converter coupled to the generator and comprising a direct current (DC) link, and a second power converter, the integration control sub-system comprising:

at least one bypass switch disposed between the DC power source and the DC-link; and a controller operatively coupled to the at least one bypass switch, wherein the controller is configured to:

determine a magnitude of a reference voltage corresponding to the DC power source;

determine a minimum voltage level of the DC-link and a maximum voltage level of the DC-link, wherein the minimum voltage level and the maximum voltage level define an acceptable range of a DC-link voltage; and connect the DC power source to the DC-link via the second power converter or connect the DC power source directly to the DC-link by bypassing the second power converter based on the magnitude of the reference voltage and the acceptable range of a DC-link voltage.

* * * * *